(12) United States Patent
Grobbauer et al.

(10) Patent No.: US 11,591,171 B2
(45) Date of Patent: Feb. 28, 2023

(54) MAGNETIC COUPLING ARRANGEMENT IN A CONVEYOR SYSTEM

(71) Applicant: BEUMER GROUP GMBH & CO. KG, Beckum (DE)

(72) Inventors: Bernd Grobbauer, Birkfeld (AT); Adrian Kachelmaier, Birkfeld (AT); Jürgen Neugebauer, Semriach (AT)

(73) Assignee: BEUMER GROUP GMBH & CO. KG, Beckum (DE)

( * ) Notice: Subject to any disclaimer, the term of this patent is extended or adjusted under 35 U.S.C. 154(b) by 14 days.

(21) Appl. No.: 17/413,076

(22) PCT Filed: Dec. 19, 2019

(86) PCT No.: PCT/IB2019/061086
§ 371 (c)(1),
(2) Date: Jun. 11, 2021

(87) PCT Pub. No.: WO2020/128941
PCT Pub. Date: Jun. 25, 2020

(65) Prior Publication Data
US 2022/0009729 A1    Jan. 13, 2022

(30) Foreign Application Priority Data
Dec. 19, 2018 (EP) .................... 18214158

(51) Int. Cl.
*B65G 54/02* (2006.01)
*B65G 17/20* (2006.01)
*B65G 19/02* (2006.01)

(52) U.S. Cl.
CPC ............. *B65G 54/02* (2013.01); *B65G 17/20* (2013.01); *B65G 19/025* (2013.01); *B65G 54/025* (2013.01)

(58) Field of Classification Search
CPC ...... B65G 54/025; B65G 54/02; B65G 17/20; B65G 19/025
(Continued)

(56) References Cited

U.S. PATENT DOCUMENTS 3,426,887 A * 2/1969 Davey .................... E05F 15/60
310/12.32
3,610,161 A   10/1971 Wishart et al.
(Continued)

FOREIGN PATENT DOCUMENTS

DE    3147414 A1    6/1983
DE    3510008 A1    12/1985
(Continued)

OTHER PUBLICATIONS

International Search Report (in English and German) and Written Opinion of the ISA (in German) issued in PCT/IB2019/061086, dated Jun. 2, 2020; ISA/EP.

*Primary Examiner* — James R Bidwell
(74) *Attorney, Agent, or Firm* — Harness, Dickey & Pierce, P.L.C.

(57) ABSTRACT

A magnetic coupling arrangement in a conveyor system, having at least one driver element for arrangement on a conveyor system, the driver element having a receiving body with a receiving space for receiving a magnet in the receiving space, wherein the magnet can be brought into coupling connection at its coupling side with a coupling side of a ferromagnetic counterpart for conveying force transmission, or has a ferromagnetic counterpart for a magnet in the receiving space. The ferromagnetic counterpart can be brought into coupling connection at its coupling side with a coupling side of a magnet for conveying force transmission. A ferromagnetic plate is arranged on the magnet on its side (Continued)

Figure 1:
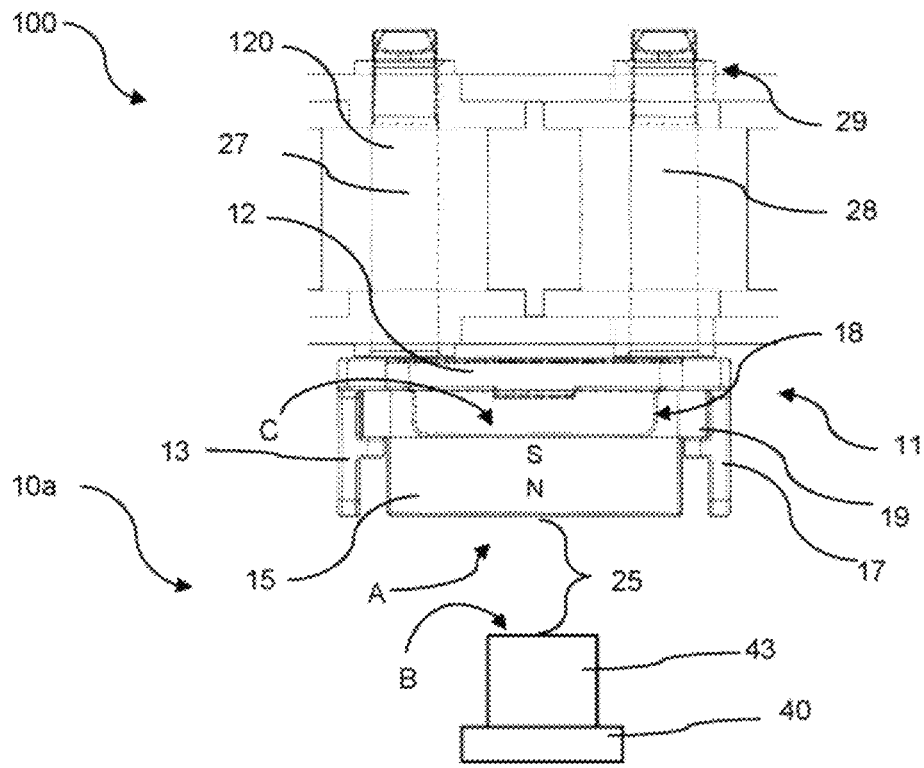

facing away from the coupling side in order to shorten the path of the magnetic lines of force on this side of the magnet.

27 Claims, 6 Drawing Sheets

(58) Field of Classification Search
USPC .................................................. 198/679, 805
See application file for complete search history.

(56) References Cited

U.S. PATENT DOCUMENTS

| | | | | |
|---|---|---|---|---|
| 4,490,922 | A * | 1/1985 | Gorodetsky | F27B 9/2461 |
| | | | | 34/247 |
| 5,947,361 | A * | 9/1999 | Berger | B65G 54/02 |
| | | | | 226/110 |
| 6,155,406 | A * | 12/2000 | Garbagnati | B65G 21/2009 |
| | | | | 198/805 |
| 8,007,644 | B2 * | 8/2011 | Kim | C23C 14/50 |
| | | | | 414/217 |
| 8,561,787 | B2 | 10/2013 | Wend et al. | |
| 2009/0183972 | A1 * | 7/2009 | Gauss | B65G 21/2009 |
| | | | | 198/805 |
| 2010/0034631 | A1 | 2/2010 | Klaiber et al. | |
| 2012/0031741 | A1 | 2/2012 | Ishino et al. | |
| 2017/0131310 | A1 | 5/2017 | Volz et al. | |

FOREIGN PATENT DOCUMENTS

| | | | | |
|---|---|---|---|---|
| DE | 19538350 | A1 | 4/1997 | |
| DE | 19938879 | A1 | 3/2001 | |
| DE | 102010010107 | A1 | 9/2011 | |
| DE | 202017107908 | U1 | 2/2018 | |
| EP | 0043399 | A1 | 1/1982 | |
| EP | 0623497 | B1 | 1/1997 | |
| EP | 3172575 | A1 | 5/2017 | |
| GB | 759117 | * | 10/1956 | ............ B65G 54/02 |
| WO | WO-2008064834 | A2 | 6/2008 | |

* cited by examiner

MAGNETIC COUPLING ARRANGEMENT IN A CONVEYOR SYSTEM

CROSS-REFERENCE TO RELATED APPLICATIONS

This application is a U.S. National Phase Application under 35 U.S.C. 371 of International Application No. PCT/IB2019/061086, filed Dec. 19, 2019, which claims priority to European Patent Application No. 18214158.0, filed Dec. 19, 2018. The entire disclosures of the above applications are incorporated herein by reference.

BACKGROUND

This section provides information related to the present disclosure which is not necessarily prior art.

TECHNICAL FIELD

The invention relates to a magnetic coupling arrangement in a conveyor system, a transport element for a conveyor system, a conveyor system and a method for the construction and maintenance of a conveyor system.

DISCUSSION

A conveyor system for suspended objects is known from DE 10 2010 010 107 A1, in which a run of a circulating drive chain drivable in a conveying direction is arranged in a transport rail. The drive chain is formed with downwardly projecting bolts. Below the drive chain, holding elements mounted on rollers are provided in the transport rail, which have an opening at their lower end for receiving the hook of a hanger with an item of clothing or a transport bag. The retaining elements each have stops at their upper ends which protrude between adjacent bolts so that a positive or frictional drive connection is made between the drive chain and the retaining elements.

The disadvantage of this known solution is that in the event of a malfunction in the conveyor system, for example if the retaining elements get caught in the conveyor system, the positive or frictional drive connections cannot be easily separated. As a result, the holding elements are deformed in the event of jamming and have to be dismantled and replaced at relatively great expense, which causes a relatively long operational downtime of the conveyor system.

EP 0 623 497 B1 describes an accumulating conveyor in which carriers for conveyed goods are arranged on a carrier rail by means of rotatably mounted rollers and can be driven in a conveying direction by a traction means in the form of a friction belt also mounted on the carrier rail. For the purpose of a desired accumulation of carriers, a stop device is provided with a holding finger which can be moved into the movement space of the carriers and acts on a spreading device attached to the carrier, whereby a lateral pivoting and thus a lifting of the carrier from the friction belt takes place.

The disadvantage of this known solution is that due to the friction belt connection between the friction belt and the carriers, a constant mechanical load acts on the carriers, so that they have to be replaced after short periods of use.

An apparatus for conveying ferromagnetic objects is known from EP 0 043 399 A1, wherein the ferromagnetic objects are conveyed on a fixed carrier. The stationary carrier forms a stationary housing in which a circulating chain is arranged on which permanent magnets are arranged. The permanent magnets are held on the chain by means of a ferromagnetic plate and move with the chain.

The disadvantage of this known solution is that the objects to be transported must be ferromagnetic in order to be movable by this conveyor.

DE 20 2017 107 908 U1 shows a conveyor system for hanging objects with a circulating, drivable conveyor chain that has a plurality of driver elements. Furthermore, the conveyor system has a plurality of transport elements, wherein each transport element has a magnetic coupling element, wherein the coupling elements of the transport elements are coupled to the driver elements of the conveyor chain via magnetic force in a contactless and detachable manner.

The disadvantage of this known solution is that this conveyor system is permanently dimensioned after it has been put into operation for the first time and its respective conveying capacity is thus finally fixed. The conveying force between the coupling elements of the conveyor elements is invariable. The coupling force of selected magnets is limited. If higher coupling forces are desired, stronger magnets must be installed. Since stronger magnets are significantly more expensive, it can happen that a once selected coupling force becomes too small during operation with regard to the requirement of the conveying capacity of the conveyor system.

SUMMARY

This section provides a general summary of the disclosure, and is not a comprehensive disclosure of its full scope or all of its features.

It is one aspect of the present invention to remedy one or more disadvantages of the prior art. In particular, a magnetic coupling arrangement in a conveyor system is to be created in which the coupling forces are greater without using stronger magnets. The manufacturing costs are to be kept low in this way. In addition, measures are to be taken to keep the influence of the magnets on the overall system by magnetic induction relatively small, so that the known magnetic coupling arrangement in the magnetic part is improved. Since the magnets in the conveyor system move along the conveyor track, the moving magnets can induce currents in electronic components, which are undesirable, since this can lead to malfunctions in the electronic components. Furthermore, a conveyor system is to be created whose flexibility is increased and whose manufacturing costs are low, and a transport element is to be created that can reliably interact with the conveyor system. Furthermore, an improved method for the assembly and maintenance of a conveyor system is to be created, whereby the conveying capacity and the assembly safety with this conveyor system are increased.

A magnetic coupling arrangement in a conveyor system according to the invention comprises at least one driver element for arrangement on a traction means of the conveyor system. The driver element comprises—as already known—a receiving body with a receiving space for receiving (a)) at least one magnet in the receiving space, wherein the magnet can be brought into coupling connection on its coupling side with a coupling side of a ferromagnetic counterpart for conveying force transmission, wherein the ferromagnetic counterpart is arranged on a transport element on which objects can be arranged for movement along the conveyor system.

Alternatively, the driver element—as already known—has a receiving body with a receiving space for receiving (b)) at least one ferromagnetic counterpart for a magnet in the receiving space, wherein the ferromagnetic counterpart can be brought into coupling connection on its coupling side with a coupling side of another magnet for conveying force transmission, wherein the magnet is arranged on a transport element on which objects can be arranged for movement along the conveyor system.

Preferably, a ferromagnetic plate is arranged on the magnet on at least one side facing away from the coupling side in order to shorten the path of the magnetic lines of force on this side of the magnet.

The ferromagnetic plate on the magnet according to teachings of the invention deflects the magnetic lines of force emerging from this magnet on its side arranged on the ferromagnetic plate in such a way that they are shortened and thus compressed. This increases the conveying force acting on the at least one ferromagnetic counterpart so that the transport element can be reliably carried along without having to reduce the conveying speed in the conveyor system. In addition, the size of the at least one magnet required for a certain driving force or conveying force can be reduced, whereby the manufacturing costs in a conveyor system are reduced. In other words, a larger coupling force and thus a larger conveying force can be generated with the same magnet.

However, the ferromagnetic plate not only compresses the magnetic lines of force, but also shields other components in the conveyor system from the magnetic lines of force of the magnet. Thus, undesired magnetisation or induction of magnetic fields from/to further components—e.g. electronic components, such as electronic sensors—in the conveyor system can be prevented according to the invention.

In addition, the conveying capacity and/or the transport efficiency of the conveyor system can be increased at the same time with equally dimensioned/designed magnets, whereby objects of different sizes and/or weights can be conveyed simultaneously in the conveyor system.

As known per se, but now improved, the magnetic coupling arrangement enables contactless conveying of at least one transport element. As is known per se, objects are arranged on or in the transport element, which are moved along the conveyor system. The transport element comprises the at least one ferromagnetic counterpart at least in sections for interaction with the at least one magnet.

In order to be able to exert the greatest possible coupling force on the at least one ferromagnetic counterpart, care should be taken that the at least one ferromagnetic counterpart is not magnetically saturated. The principle applies that with a larger volume of the at least one ferromagnetic counterpart, magnetic saturation is achieved later than with a smaller volume of the ferromagnetic counterpart, and vice versa.

Advantageously, the at least one ferromagnetic counterpart therefore has a volume of 50 mm$^3$ to 400 mm$^3$. Thus, the magnetic saturation of the at least one ferromagnetic counterpart can be sufficiently prevented. For example, the ferromagnetic counterpart is made of a steel alloy. In particular, the ferromagnetic counterpart has the specification 1.0715 (11SMN30+Ci). In particular, the volume of the at least one ferromagnetic counterpart is to be designed proportional to the magnetisation saturation of the at least one magnet. If the volume of the at least one ferromagnetic counterpart is undersized, the magnetic saturation is present therein, so that the maximum conveying force transmission that can be generated by the at least one magnet cannot be achieved in the at least one ferromagnetic counterpart.

Advantageously, the at least one ferromagnetic counterpart has a square surface, so that the projected area of the coupling side of the at least one ferromagnetic counterpart can be increased. Thus, the ferromagnetic counterpart can receive an increased magnetic field line flux from the magnet so that the coupling force on the transport element is increased by this further development of the invention. However, care should be taken to ensure that the magnetisation in the at least one ferromagnetic counterpart does not become saturated.

Preferably, the at least one ferromagnetic counterpart is also a magnet. In this case, the magnetic pole of the ferromagnetic counterpart is arranged complementary to the magnetic pole of the at least one magnet on the at least one driver element, so that the coupling force can be further increased. For example, the construction weight of the structure of the magnetic coupling arrangement can thereby be reduced. If the ferromagnetic counterpart is itself designed as a magnet, it can have a smaller volume with the same coupling force.

A complementary arrangement of magnets on the coupling side comprises at least two magnets, these magnets being arranged so that the south pole of a first magnet faces the north pole of a second magnet, or vice versa.

Preferably, each magnet—i.e. also the one forming the ferromagnetic counterpart—is associated with a ferromagnetic plate on at least one of its sides facing away from the coupling side, the magnets being arranged so that north poles and south poles face each other. For example, a first magnet may be arranged on the at least one driver element and a second magnet may be arranged on the transport element, wherein the first magnet is arranged complementary to the second magnet and a first ferromagnetic plate is arranged on the first magnet and a second ferromagnetic plate is arranged on the second magnet. Thus, the path of the respective magnetic lines of force of the respective magnets is shortened and thus their coupling force or the conveying force transmission is increased according to the invention.

In particular, the at least one magnet arranged on the ferromagnetic plate is diametrically magnetised. This closes the magnetic lines of force in the region of the ferromagnetic counterpart, so that the latter can be easily magnetised.

Preferably, the ferromagnetic plate is formed in an angular shape on at least one plate side. In this case, one plate side of the ferromagnetic plate is in direct contact with the at least one magnet and the plate side of the ferromagnetic plate which is at an angle thereto interacts in a holding manner with the receiving body of the at least one driver element or with the base body of the transport element.

Preferably, an adjustable air gap extends between the coupling side of the at least one magnet and the coupling side of the at least one ferromagnetic counterpart, the spatial extension of which in at least one direction is between 0.05 mm and 5 mm. The air gap causes a contactless entrainment of the transport elements, whereby the material wear on the transport element, which is typically guided in a conveyor rail of the conveyor system, is reduced during conveying through the conveyor system. Furthermore, the air gap reduces the risk of magnetic saturation in the ferromagnetic counterpart, so that an adjustable conveying force transmission is ensured.

The air gap between the at least one magnet and the at least one ferromagnetic counterpart can be adjusted, for example, with a magnetisation device. In this case, the at least one magnet can be magnetised to such an extent that its increased magnetic force acts on the ferromagnetic counterpart. As a result, the ferromagnetic counterpart, which is located on the transport element, for example, is attracted more strongly so that the air gap is shortened. The conveyor rail in which the transport element is arranged prevents the ferromagnetic counterpart from resting directly against the magnet. The air gap between at least one magnet and the at least one ferromagnetic counterpart can extend essentially in a vertical direction. This makes it possible to convey vertically arranged transport elements.

However, the air gap between the at least one magnet and the at least one ferromagnetic counterpart may alternatively extend substantially in the horizontal direction. For example, the coupling side of the at least one magnet and the coupling side of the at least one ferromagnetic counterpart can be horizontally opposite each other. In this way, a transport element located laterally of the at least one driver element can also be easily conveyed.

Preferably, the air gap between the at least one magnet and the at least one ferromagnetic counterpart is adjustable by means of a mechanical adjusting device. The adjusting device can either be arranged on the traction means of the conveyor system or on the conveyor rail arrangement of the conveyor system. The adjusting device can be an insert—for example a plastic insert—which changes the distance between the traction means and the transport element and thus changes the air gap.

Alternatively or additionally, the adjusting device comprises a stroke drive which changes the distance between the at least one magnet arranged on the traction means and the at least one ferromagnetic counterpart arranged on the transport element—if necessary by remote control. This allows the air gap to be adjusted very finely and, if necessary, continuously.

Preferably, the spatial extension of the air gap in at least one direction is between 0.1 mm and 3 mm. This further improves the transmission of conveying force to the transport element and prevents undesired magnetisation of the ferromagnetic counterpart.

Preferably, the ferromagnetic plate is detachably arranged on the magnet for influencing the conveying force transmission. This allows the ferromagnetic plate to be separated and replaced on the at least one driver element or on the at least one ferromagnetic counterpart. If the ferromagnetic plate is removed, the coupling force but also the weight of the assembly decreases at the same time.

Alternatively or complementarily, the ferromagnetic plate is adjustably arranged relative to the at least one magnet. For example, the ferromagnetic plate is arranged to be rotatable relative to the magnet. A rotation of the ferromagnetic plate changes—with a corresponding structure of the ferromagnetic plate—the path of the magnetic lines of force and thus the spatial density of the magnetic lines of force. This allows the magnetic flux density on the coupling side of the magnet to be changed so that the conveying force transmission to the transport element can be adjusted. The ferromagnetic plate may also have a preferred metallurgical molecular structure (orientation), such as a rolling orientation, to enhance this effect.

In particular, in another embodiment example, the ferromagnetic plate is materially bonded to the at least one magnet. Thus, the ferromagnetic plate is firmly connected—for example glued—to this magnet and an undesired slipping of the ferromagnetic plate relative to this magnet can be prevented. In this way, the transmission of conveying force in the magnetic coupling arrangement can be kept constant.

Preferably, at least one further magnet is placed at the side of the or each magnet, which is also connected to the ferromagnetic plate on at least one side facing away from the coupling side. In this way, the transmission of the conveying force can be further improved, for example in the case of high coupling forces if required.

Advantageously, the further magnet is also materially connected to a further ferromagnetic plate on at least its side facing away from the coupling side. This prevents undesired slippage of the ferromagnetic plate so that the field line density remains unchanged. Furthermore, the ferromagnetic plate may simultaneously act as a holding device for the magnets, in particular if one plate side of the ferromagnetic plate is in direct contact with the further magnet and the plate side of the ferromagnetic plate at an angle thereto cooperates in a holding manner with the receiving body of the at least one driver element or with the base body of the transport element.

Preferably, the further magnet is arranged laterally adjacent to the or each magnet. On the one hand, this makes it possible to create an effective field line distribution in the magnetic coupling arrangement, so that the conveying force transmission to the transport element is improved.

Preferably, the magnetic poles of the further magnet are aligned complementary to the magnetic poles of the magnet. A complementary orientation of the two magnets to each other increases the magnetic field line density in the boundary region of the two magnets to each other. This allows the ferromagnetic counterpart to be kept stable in the vicinity of this boundary region.

Preferably, an insulating layer is provided between the magnet and the at least one other magnet. The insulating layer may comprise a non-magnetic material, whereby the magnetic lines of force can be easily deflected and thus magnets of smaller designs can be used in the magnetic coupling arrangement.

Preferably, the insulating layer is formed by an air gap. On the one hand, an air gap between the at least one magnet and the at least one further magnet enables a lightweight design of the at least one driver element or the transport element. on the other hand, this structure has an even stronger centring effect on the ferromagnetic counterpart in the case of coupling.

Preferably, the magnets and the other magnets are cuboidal. Cuboidal magnets can be arranged close together over a large area so that their magnetic lines of force have a particularly suitable field line distribution in the boundary region. This means that the magnetic coupling arrangement can be compactly constructed.

Alternatively, the magnets and further magnets are cylindrical in shape, whereby the magnets can be easily mounted so that they can be arranged centrally adjacent to the ferromagnetic counterpart.

Preferably, the magnets and further magnets are made of sintered material. This makes high performance magnets feasible. For example, sintered neodymium is used, in particular of grade N35 to N54.

Advantageously, the magnets and the other magnets are axially magnetised. An axially magnetised magnet has a south pole and a north pole in sections along its longitudinal axis. Axially magnetised magnets can be easily arranged next to each other.

Alternatively, the magnets and the other magnets are diametrically magnetised. A diametrically magnetised magnet has a south pole and a north pole normal to its longitudinal axis. Diametrically magnetised magnets can be easily arranged one above the other.

In particular, the magnets are chemically nickel-plated on their surface. This means that the magnets cannot corrode even in humid or aggressive environments. They can also be cleaned more easily and are abrasion-resistant. Furthermore, it is easier to remove any metal chips from the nickel-plated surface that may have adhered due to the magnetic effect.

Preferably, the receiving body has at least two receiving clamps that hold at least the ferromagnetic plate in a form-fitting manner. This can prevent the ferromagnetic plate from slipping into an undesired position or being lost in the conveyor system. The positive connection between the receiving body and the ferromagnetic plate enables easy replacement of the ferromagnetic plate.

In particular, the receiving body is constructed of non-magnetic material, whereby the receiving body does not or hardly influence the field line distribution.

Preferably, the receiving body is made of plastic. In this way, the weight of the at least one driver element can be kept small and the production is simple, e.g. as an injection-moulded part.

Preferably, the receiving body has at least one traction means connection for connecting the at least one driver element to a traction means. The traction means connection on the at least one entraining element enables simple installation on the traction means, so that when the at least one entraining element is replaced, the conveyor system has only a short downtime.

Preferably, the at least one traction element connection is designed as a bolt. The bolt can be inserted directly into the traction device and released from it again. For example, in the case of a conveyor chain as a traction means, the bolt can, on the one hand, perform a holding function and, on the other hand, hold two adjacent conveyor chain links together in a non-positive manner, which saves additional measures.

In particular, the traction means connection comprises two bolts, so that the driver and thus the at least one magnet is arranged stationary on the traction means—for example, secured against rotation relative to the conveying direction of the traction means. This prevents a change in the magnitude and/or direction of the magnetic lines of force and keeps the conveying force transmission to the transport element constant.

A magnetic coupling arrangement according to the invention comprises at least one driver element for arrangement on a traction means of a conveyor system. The driver element has a receiving body with a receiving space for receiving (a)) at least one magnet in the receiving space, wherein the magnet can be brought into coupling connection on its coupling side with a coupling side of a ferromagnetic counterpart for conveying force transmission, wherein the ferromagnetic counterpart is arranged on a transport element on which objects can be arranged for movement along the conveyor system.

Alternatively, the driver element has a receiving body with a receiving space for receiving (b)) at least one ferromagnetic counterpart for a magnet in the receiving space, wherein the ferromagnetic counterpart can be brought into coupling connection on its coupling side with a coupling side of a magnet for conveying force transmission, wherein the magnet is arranged on a transport element on which objects can be arranged for movement along the conveyor system.

This magnetic coupling arrangement is suitable to be arranged in a conveyor system as described below. The magnetic coupling arrangement for this conveyor may further comprise the previously described embodiments of the magnetic coupling arrangement in the conveyor.

A conveying element for a conveyor according to the invention comprises a base body comprising a coupling portion and a conveying portion, the coupling portion being adapted to be coupled to the conveyor and having at least one ferromagnetic counterpart, and the conveying portion having conveying means for guiding in the conveyor. The at least one ferromagnetic counterpart is incorporated in the base body and is thus connected thereto in a force-fitting or form-fitting manner. Alternatively, the at least one ferromagnetic counterpart is detachably arranged on the coupling section.

The transport element is typically made of a plastic, as the transport element should be light and resistant. The at least one ferromagnetic counterpart can be positively arranged in a receptacle on the coupling section, or can be incorporated into the plastic, e.g. injection-moulded through it, for example as a plurality of ferromagnetic counterparts, so that the coupling section itself becomes ferromagnetic. This can reduce the overall weight of the transport element.

Preferably, the at least one ferromagnetic counterpart is incorporated into the coupling portion using a forming process. For example, the ferromagnetic counterpart is injected into the coupling section as a plurality of ferromagnetic counterparts or as a whole. In this case, at least the coupling section of the transport element is designed as a 2-component injection-moulded plastic part—at most with fibre reinforcement.

Preferably, the base body of the transport element has a communication section, which comprises a recognition device. This enables at least the position of the transport element in the conveyor system to be determined. Furthermore, the recognition device can contain information about the product arranged on the transport element.

In particular, the base body comprises a load section, which is designed for arranging load objects. The load section is that section of the transport element which is furthest away from the traction means and which, in the event of a pendulum movement of the transport element on the conveyor system, is very likely to collide with another element of the conveyor system. Due to the magnetic coupling arrangement—as described here—it can be newly and advantageously ensured that neither the transport element nor another component of the conveyor system is mechanically deformed, since the transport element can automatically disengage from the magnetic coupling arrangement in the event of an excessive pendulum movement and is not forced further against resistance and with material deformation.

Preferably, the transport element has an anti-penetration device. The penetration protection prevents the load section from penetrating into the traction means and/or into a conveyor rail of the conveyor system. The penetration protection is advantageously arranged on the load section or is a component of the load section. The penetration protection can be a widened section on the load section, the width of which is dimensioned in such a way that this section cannot penetrate into the opening of the conveyor rail. In this way, a cost-effective and durable transport element can be produced and, in particular, the operational stability of the conveyor system can be improved.

A conveyor system according to the invention for conveying suspended or stationary objects comprises a traction means and a conveyor drive for driving the traction means, wherein the conveyor system comprises at least one driver element and at least one transport element, between which a magnetic coupling arrangement as described herein is present.

According to the invention, the conveyor system can be flexibly extended with the aid of the magnetic coupling arrangements arranged there. The traction means of a conveyor system and thus the carriers arranged thereon can typically be moved along a closed conveyor path. The traction means can move in a first conveyor rail of a conveyor rail arrangement and the transport elements arranged on the conveyor system can move in a second conveyor rail of the conveyor rail arrangement. In addition to a substantially horizontal conveyor track, the conveyor track may also have an incline or decline. The magnetic coupling arrangement as described herein can convey transport elements arranged thereon along the inclines of the conveyor track. In addition, the magnetic coupling arrangement can also be used to brake any freely movable transport elements that would be accelerated by a gradient in the conveyor section due to gravity. For example, a transport element can be braked or decelerated to a gradient of up to 15°. This means that the otherwise necessary mechanical stoppers in the area of the gradient along the conveyor line can be omitted, so that the overall costs of the conveyor system are reduced and the flexibility of the conveyor system is increased. Furthermore, maintenance costs can be reduced, as the otherwise necessary stoppers have to be replaced from time to time due to wear.

In particular, the traction means is a conveyor chain. A conveyor chain is a reliable traction means that can be adapted as desired, for example by increasing or decreasing the number of conveyor chain links.

Preferably, an adjustment device is provided for adjusting a distance between the traction means and the at least one transport element. The adjusting device allows the distance between the at least one magnet and the at least one ferromagnetic counterpart to be adjusted, thereby allowing the air gap in the magnetic coupling arrangement to be adjusted.

Preferably, the conveyor comprises a further driver element, the further driver element being spaced from the first driver element on the pulling means. Multiple entraining elements increase the conveying capacity of the conveyor system, as each entraining element can convey at least one transport element.

Preferably, the distance between the driver element and the further driver element along the traction means is adjustable between 10 mm and 1500 mm. This allows the pitch distance to be adjusted along the traction means, so that the conveyor system can be equipped with transport elements of different sizes, or loads can be loaded onto the transport elements. This further increases the flexibility of the conveyor system.

In particular, the distance between the carrier element and the further carrier element along the traction means can be adjusted between 15 mm and 250 mm. Thus, a good compromise between conveying capacity of the conveyor system and flexibility of the conveyor system can be achieved.

A method according to the invention for setting up and maintaining a conveyor system as described herein comprises:

Providing a magnetising device on the conveyor system, which may be temporarily arranged on the conveyor system, or may be an integral part of the conveyor system.

Magnetising at least one magnet or at least one ferromagnetic counterpart with a magnetic force by means of the magnetising device before the conveyor is put into operation.

This allows the magnets and/or the transport elements in the magnetic coupling arrangement to be individually magnetised. According to the invention, the magnetisation of the respective magnets or transport elements is only carried out with a magnetisation device at the assembly site of the conveyor system.

Preferably, the magnetisation of a further magnet or a further ferromagnetic counterpart with a magnetic force is carried out with the aid of the magnetisation device before commissioning.

If several magnets are found as coupling elements to the ferromagnetic counterparts along a traction means, these can also be magnetised differently in order to assign different coupling/conveying forces to them. This further increases the flexibility of the conveyor system.

A magnetisation device according to the invention for magnetising at least one magnet or at least one ferromagnetic counterpart is used on an installed conveyor system with a magnetic coupling arrangement. This allows the at least one magnet or the at least one ferromagnetic counterpart to be magnetised with any predefined magnetic force, thus increasing the flexibility of the conveyor system as described herein.

If there is a magnetisation device on the conveyor system, the magnets can also be remagnetised during maintenance.

The magnetisation device could also be used to demagnetise any undesirably magnetised counterparts, so that full functionality and full conveying force are restored in the event of maintenance.

A conveyor system according to the invention for conveying suspended objects comprises a traction means and a conveyor drive for driving the traction means, wherein the conveyor system comprises at least one at least one transport element, wherein the traction means comprises an electromagnetic levitation system or an electrodynamic levitation system.

In such a conveyor system, the transport elements can be fed into and discharged from the conveyor line at any position of the conveyor system. This not only increases the conveying capacity, but also creates a flexibly designed conveyor system. The above-described conveyor system enables a stepless adjustment of the magnetic conveying force transmission to the transport element, for example by steplessly increasing or decreasing the currents in the electrodynamic levitation system.

Further advantages, features and details of the invention will be apparent from the following description, in which embodiments of the invention are described with reference to the figures. Enumerations such as first, second, third or further serve merely to identify the components.

The list of reference signs, like the technical content of the claims and figures, forms part of the disclosure. The figures are described in a coherent and comprehensive manner. Identical reference signs indicate identical components, reference signs with different indices indicate functionally identical or similar components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
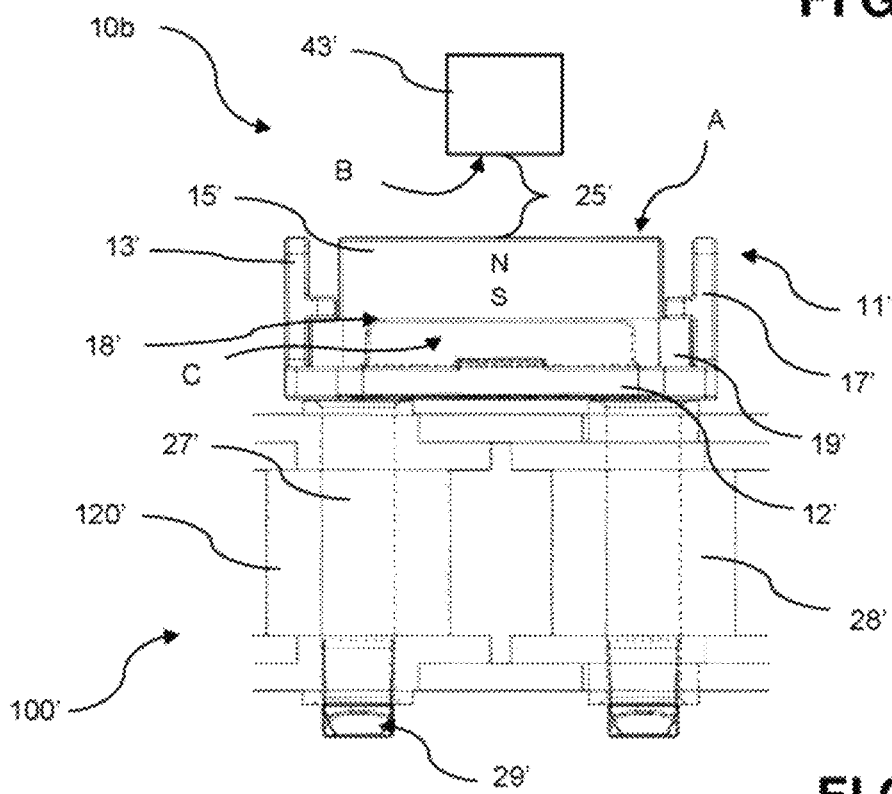
Figure 3:
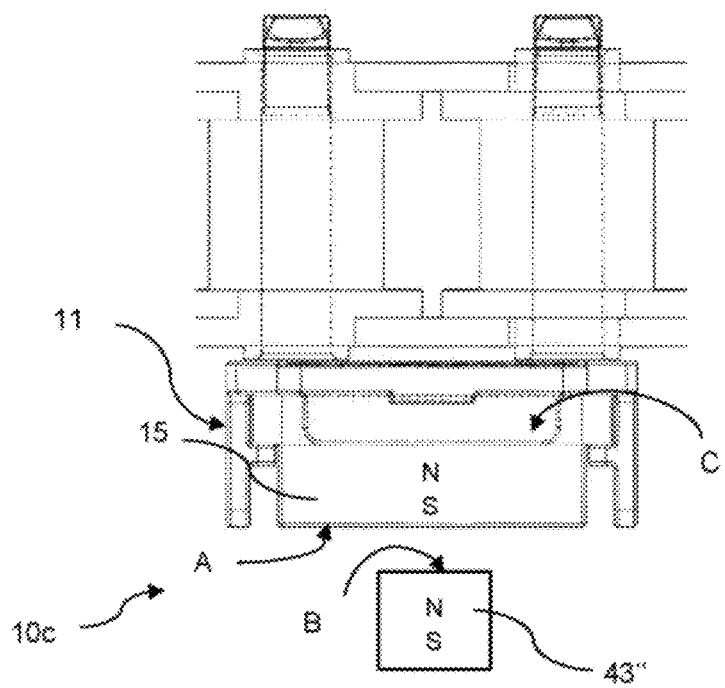
Figure 4:
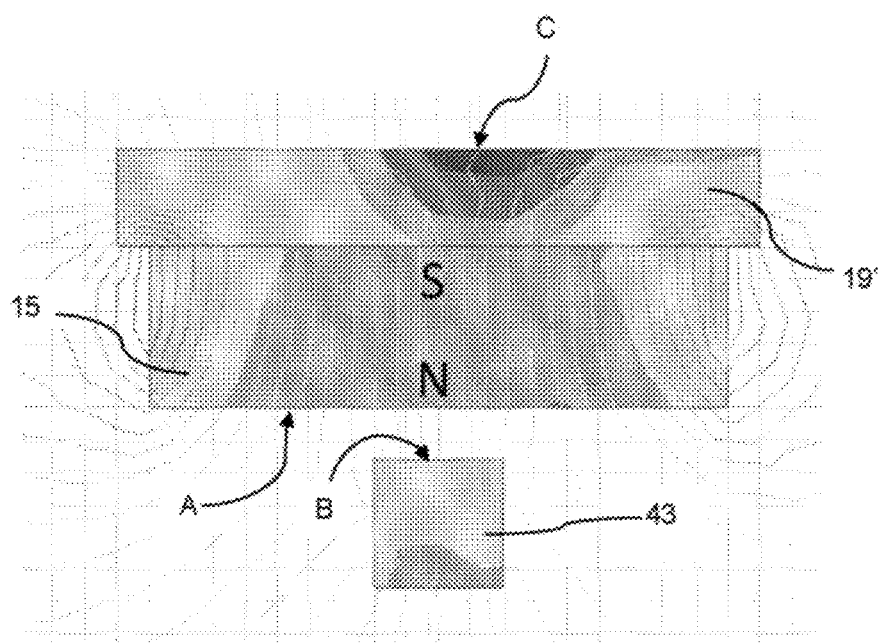
Figure 5:
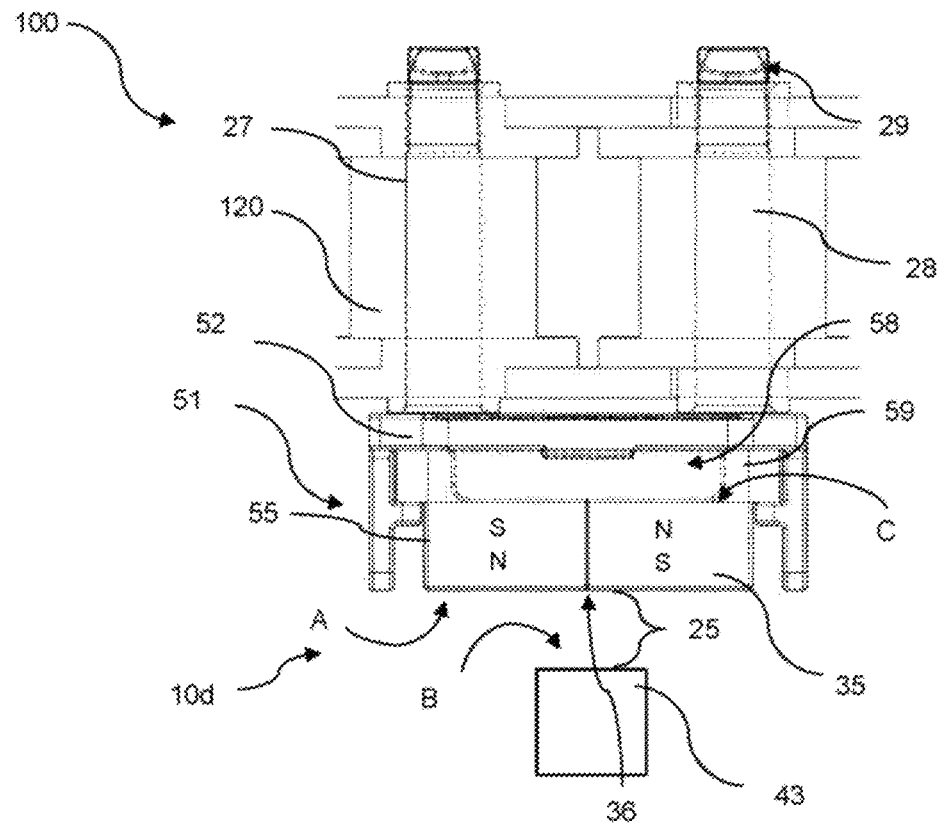
Figure 6:
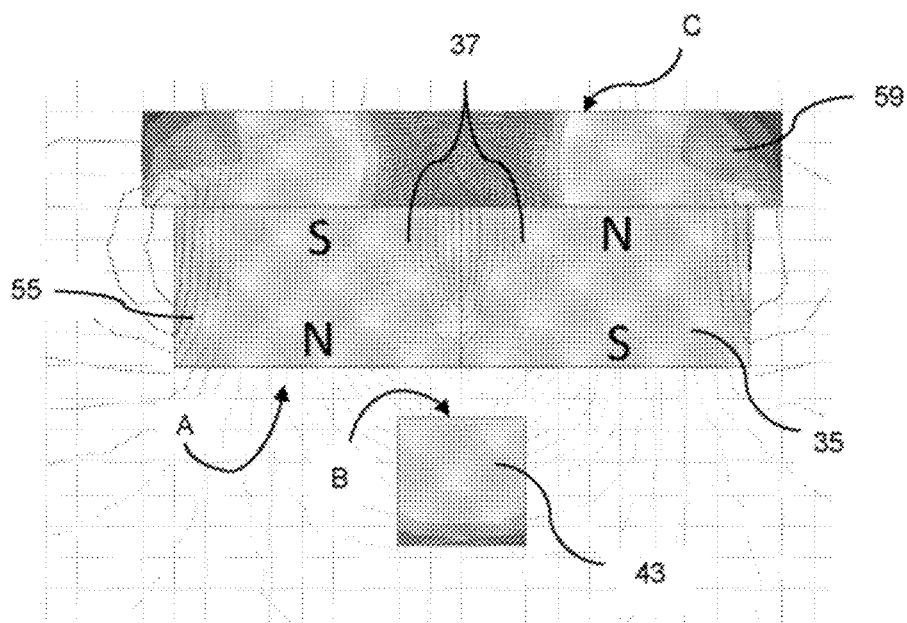
Figure 7:
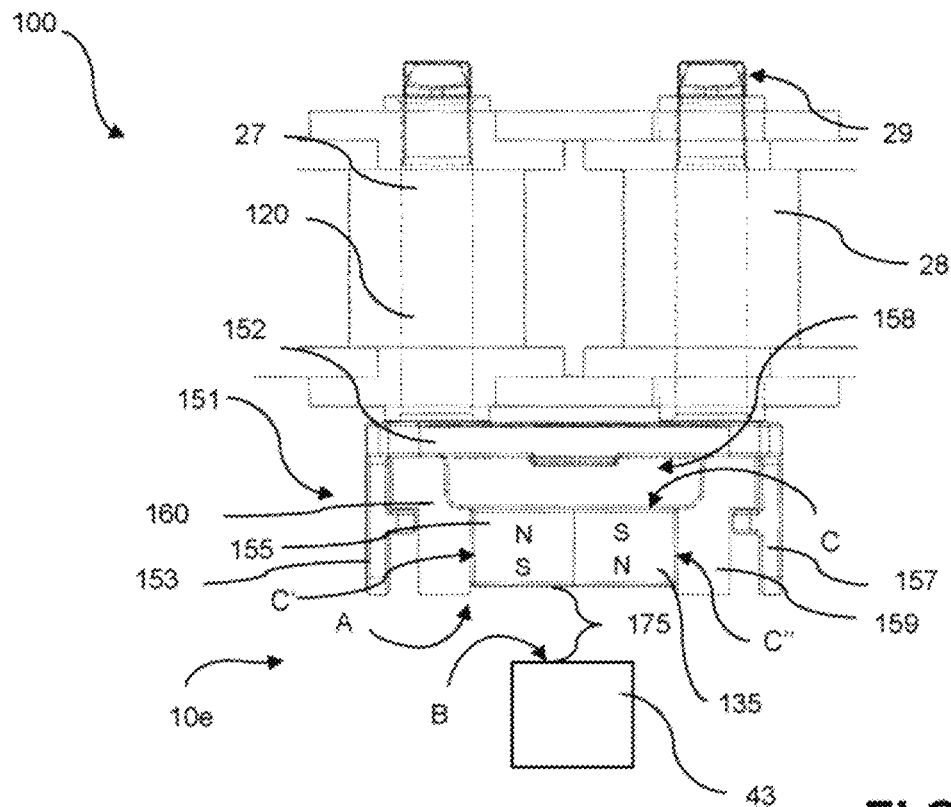
Figures 8, 9:
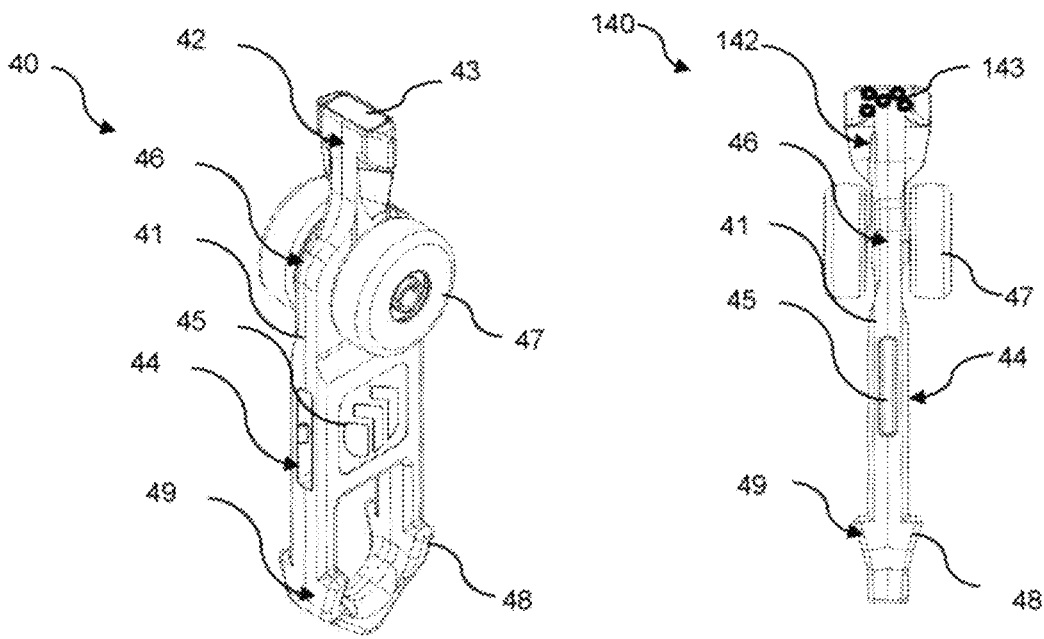
Figure 10:
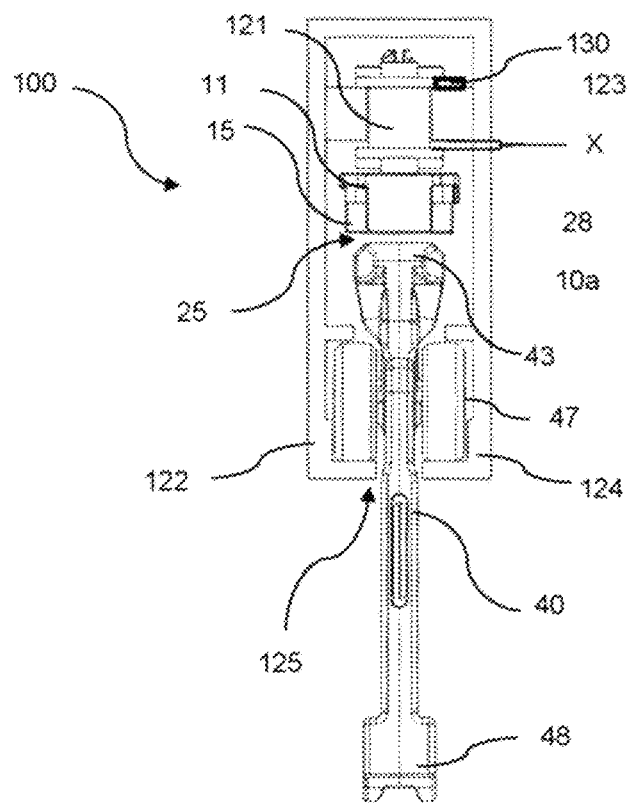
Figure 11:
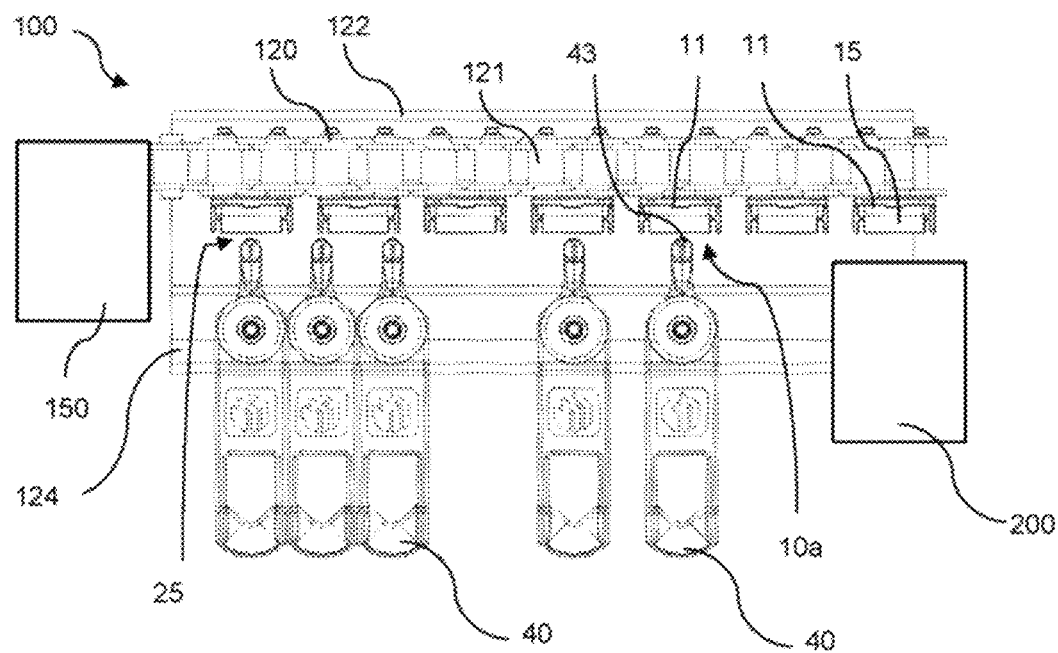
Figure 12:
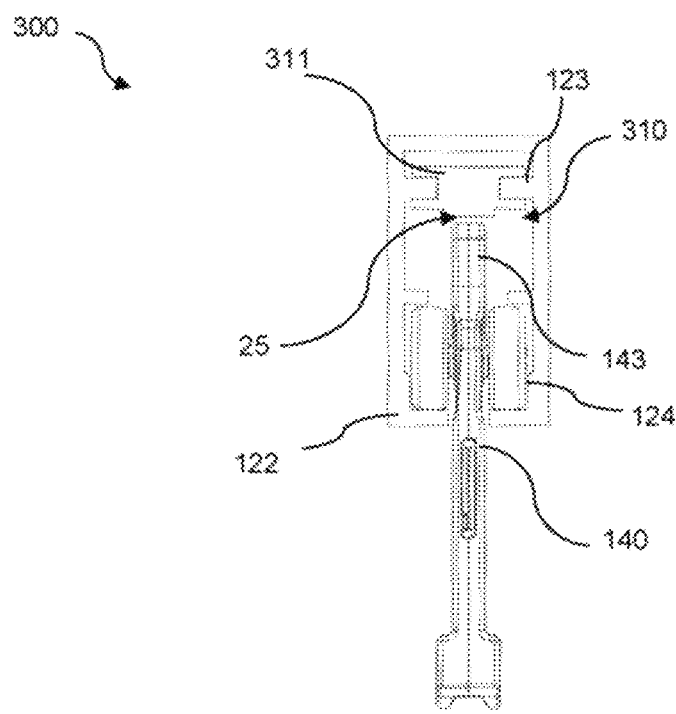
Figure 13:
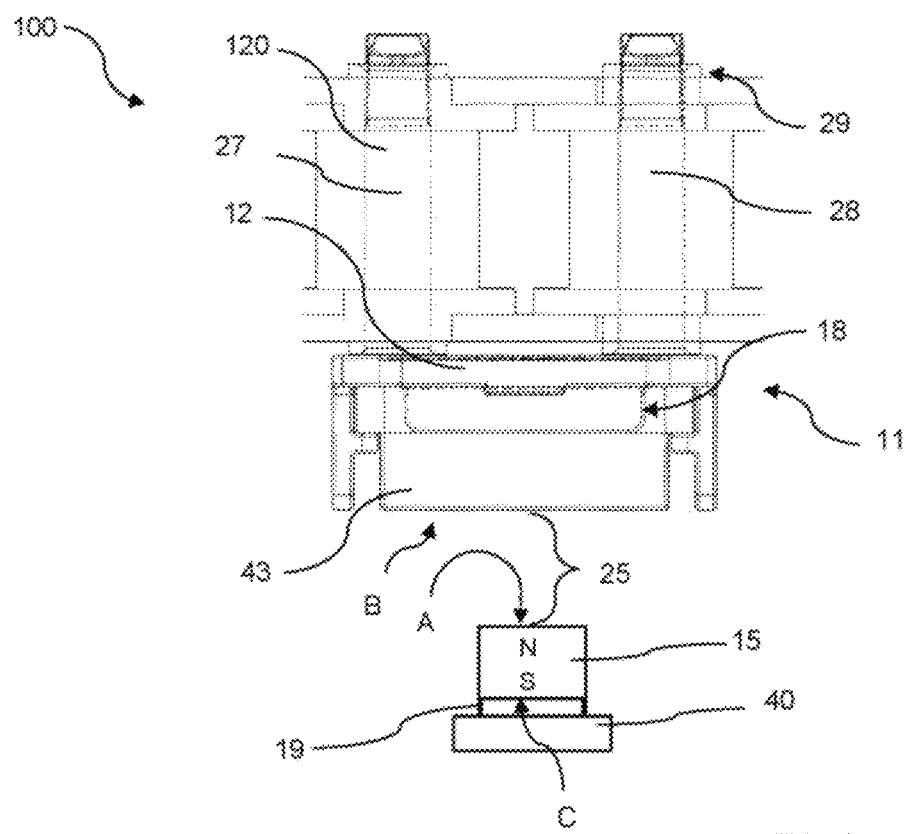

The figures show:

FIG. 1 a first embodiment of a magnetic coupling arrangement according to the invention, FIG. 2 a second embodiment of a magnetic coupling arrangement according to the invention, FIG. 3 a third embodiment of a magnetic coupling arrangement according to the invention, FIG. 4 a simulation of the magnetic field line distribution in a magnetic coupling arrangement according to FIG. 1 or FIG. 2, FIG. 5 a fourth embodiment of a magnetic coupling arrangement according to the invention, FIG. 6 a simulation of the magnetic field line distribution in a magnetic coupling arrangement according to FIG. 5, FIG. 7 a fourth embodiment of a magnetic coupling arrangement according to the invention, FIG. 8 a first embodiment of a transport element according to the invention, FIG. 9 a further embodiment of a transport element according to the invention, FIG. 10 a first embodiment of a conveyor system according to the invention, FIG. 11 a further view of the conveyor system according to FIG. 11, FIG. 12 a further embodiment of a conveyor system according to the invention, and FIG. 13 a further embodiment of a magnetic coupling arrangement according to the invention.

DETAILED DESCRIPTION

Example embodiments will now be described more fully with reference to the accompanying drawings.

FIG. 1 shows a magnetic coupling arrangement 10a in a conveyor system 100. The magnetic coupling arrangement 10a comprises a driver element 11, which is arranged on a traction means 120 of the conveyor system 100. The driver element 11 has a receiving body 12 made of plastic with a receiving space 18 for receiving at least one magnet 15 (as shown). The magnet 15 can be brought into coupling connection at its coupling side A with a coupling side B of a ferromagnetic counterpart 43 for conveying force transmission. A ferromagnetic plate 19 is arranged on the magnet 15 on the side C facing away from the coupling side A in order to shorten the path of the magnetic lines of force on this side C of the magnet 15. In this embodiment, the ferromagnetic plate 19 is materially connected to the magnet 15 and is held in the receiving space 18 by the receiving clamps 13, 17. The receiving clamps 13, 17 are elastic so that the ferromagnetic plate 19 and thus the magnet 15 can be separated from the driver element 11.

The driver element 11 has two bolts 27, 28 on the receiving body 12, which are connected to traction means 120 of the conveyor system 100. The bolts 27, 28 are held on the traction means with the aid of a securing device 29.

The ferromagnetic counterpart 43 has the specification 1.0715 (11SMn30+Ci) and is—preferably, chemically—nickel-plated on the surface. The ferromagnetic counterpart 43 can be rolled or cold drawn. The magnet 15 is made of nickel. Alternatively, the magnet 15 may be made of iron or cobalt or an alloy thereof. Of course, rare earth magnets may also be used.

Between the coupling side A of the magnet 15 and the coupling side B of the ferromagnetic counterpart 43 extends an air gap 25, the extent of which is adjustable with the aid of the variable magnetic force. The spatial extension can be adjusted between 0.05 mm and 5 mm.

The ferromagnetic counterpart 43 is arranged on a transport element 40, with which in particular hanging objects are transported. The ferromagnetic counterpart 43 has a cuboid structure with a volume of—in this embodiment example—about 150 mm$^3$.

FIG. 2 shows a magnetic coupling arrangement 10b in a conveyor system 100', which is constructed similarly to the conveyor system 100 according to FIG. 1. The conveyor system 100' has a traction means 120' comprising a driver element 11' with a receiving body 12' and with a receiving space 18' for receiving a magnet 15'. The magnet 15' can be brought into coupling connection at its coupling side A with a coupling side B of a ferromagnetic counterpart 43' for transmitting the conveying force. In this magnetic coupling arrangement 10b, the traction means 120 with the driver element 11' arranged thereon and the ferromagnetic counterpart 43' are spatially interchanged by 180°. A ferromagnetic plate 19' is arranged on the magnet 15' on the side C facing away from the coupling side A in order to shorten the path of the magnetic lines of force on this side C of the magnet 15'. The ferromagnetic plate 19' is connected to the magnet 15' by a material bond and is held in the receiving space 18' by the receiving clamps 13', 17'. The receiving clamps 13', 17' are elastic so that the ferromagnetic plate 19' and thus also the magnet 15' can be separated from the driver element 11'. The driver element 11' has two bolts 27', 28' on the receiving body 12', which are connected to traction means 120' of the conveyor system 100'. The bolts 27', 28' are held on the traction means with the aid of a securing device 29'.

FIG. 3 shows a further embodiment of a magnetic coupling arrangement 10c, the structure of which essentially corresponds to the magnetic coupling arrangement 10a according to FIG. 1. However, the magnetic coupling arrangement 10c differs from the magnetic coupling arrangement 10a in that the ferromagnetic counterpart 43" is also a magnet. The magnetic poles (N-S) of the ferromagnetic counterpart 43" are arranged complementary to the magnetic poles (S-N) of the magnet 15 in the driver element 11.

As an alternative to the magnetic coupling arrangements 10a to 10c, a further magnetic coupling arrangement has a driver element 11 with a receiving body 12, the receiving space 18 of which has a ferromagnetic counterpart 43, wherein the ferromagnetic counterpart 43 can be brought into coupling connection at its coupling side B with a coupling side A of a magnet 15 for transmitting the conveying force. The magnet 15 is arranged on a transport element 40 (see FIG. 13).

FIG. 4 shows an exemplary field line distribution in the magnetic coupling arrangements 10a, 10b according to FIG. 1 and FIG. 2. The magnetic field lines are generated in the axially magnetised magnet 15 and emerge from the magnet 15 at its north pole N and its south pole S. The field lines would be generated in the magnet 15 without the ferromagnetic coupling. Without the ferromagnetic plate 19 and without the ferromagnetic counterpart 43, the field lines would emerge from one pole of the magnet evenly and distributed in clumps and re-enter the other pole of the magnet 15, forming—as is known—a closed field line path. However, the presence of the ferromagnetic plate 19 shortens the path of the magnetic lines of force and saturates the ferromagnetic plate 19 on the side C facing away from the coupling side A of the magnet 15 (dark area in 19). This allows an increased magnetic force to be transmitted to the coupling side B of the ferromagnetic counterpart 43, so that the magnet 15 and the ferromagnetic counterpart 43 can be brought into a more forceful couplable connection.

FIG. 5 shows another magnetic coupling arrangement 10*d* in a conveyor system 100, which is substantially similar to the previously described magnetic coupling arrangements 10*a* to 10*c*. The magnetic coupling arrangement 10*d* comprises a driver element 51 for arrangement on the traction means 120 of the conveyor system 100. The driver element 51 has a receiving body 52 with a receiving space 58 for receiving a magnet 55 and a magnet 35. The magnetic poles (N-S) of the magnet 55 are aligned complementary to the magnetic poles (S-N) of the other magnet 35. The magnets 55, 35 are arranged adjacent to each other and rest against each other. An insulating layer 36 of non-magnetic material or simply a space (air) can be arranged between the magnets 55 and the magnet 35. The magnets 55, 35 are brought into coupling connection at their coupling side A with a coupling side B of a ferromagnetic counterpart 43 for conveying force transmission. A ferromagnetic plate 59 is arranged on the magnets 55, 35 on their side C facing away from the coupling side A in order to shorten the path of the magnetic lines of force on this side C of the magnets 55, 35. As already described in FIG. 1 to FIG. 3, the ferromagnetic plate 59 is materially connected to the magnets 55, 35 and is held in the driver element 52.

FIG. 6 shows a symbolic field line distribution in the magnetic coupling arrangement 10*d* according to FIG. 5. The magnetic field lines are generated in the axially magnetised magnets 55 and 35 and emerge at their north pole N and their south pole S. The magnetic field lines are generated in the magnets 55 and 35. The magnets 55 is arranged laterally adjacent to the magnet 35, the magnets 55, 35 being aligned in a complementary manner. The complementary orientation of the two magnets 55, 35 to each other increases the magnetic field line density in the boundary region 37 of the two magnets 35, 55. The ferromagnetic plate 59 shortens the path of the magnetic lines of force. It is saturated in the boundary region of the two magnets 35, 55 on the side C facing away from the coupling side A of the magnets 55, 35 (dark region in 59).

By this measure, an increased magnetic force can be transmitted to the coupling side B of the ferromagnetic counterpart 43, so that the magnets 55, 35 and the ferromagnetic counterpart 43 can be brought into a more powerful coupling connection with the same strength of the magnets 55, 35 and an improved transmission of the conveying force takes place.

FIG. 7 shows a further magnetic coupling arrangement 10*e* in a conveyor system 100, which is essentially comparable to the magnetic coupling arrangements 10*a* to 10*d* described above. The magnetic coupling arrangement 10*e* comprises a driver element 151 for arranging the traction means 120 of the conveyor system 100. The driver element 151 has a receiving body 152 with a receiving space 158 for receiving a magnet 155 and a magnet 135. Here, the magnetic poles (N-S) of the magnet 155 are aligned complementary to the magnetic poles (S-N) of the magnet 135. The magnets 155, 135 are arranged adjacent to each other and abut each other. The magnets 155, 135 are brought into coupling connection at their coupling side A with a coupling side B of the ferromagnetic counterpart 43 for conveying force transmission, with an air gap 175 being formed vertically therebetween. A ferromagnetic plate 159 and 160 is arranged on each of the magnets 155, 135 on their side C' and C" facing away from or adjacent to the coupling side A in order to shorten the path of the magnetic lines of force on this side C' and C" of the magnets 155, 135. In these embodiment examples, the ferromagnetic plates 159 and 160 are materially bonded to the respective magnets 155, 135. The ferromagnetic plates 159 and 160 are formed here in an angular shape. One of the plate sides of the respective ferromagnetic plates 159 and 160 is in direct contact with the respective magnets 155, 135. The plate sides of the respective ferromagnetic plates 159 and 160 which are at an angle thereto are held in the driver element 152 with the aid of the receiving clamps 153 and 157.

In a further embodiment of the magnetic coupling device (10*a-e*) described herein, which is not shown, the ferromagnetic plate 59 is detachably arranged on the magnets 15, 55, 35 for influencing the transmission of the conveying force. Alternatively or complementarily, the ferromagnetic plate 19, 59 is adjustably arranged relative to the magnets 15, 55, 35. For example, the ferromagnetic plate 19, 59 is arranged to be rotatable relative to the magnet 15, 55, 35. Rotating the ferromagnetic plate 19, 59 changes the path of the magnetic lines of force and thus the spatial density of the magnetic lines of force (FIG. 1 to FIG. 7).

FIG. 8 shows a first embodiment of a transport element 40. The transport element 40 for a conveyor system 100 has a base body 41 which comprises a coupling section 42 and a conveying section 46, the coupling section 46 being designed for coupling to the conveyor system 100. The ferromagnetic counterpart 43, 43', 43" described in FIGS. 1 to 8 is detachably arranged on the coupling section 46. The conveying section 46 has two conveying rollers as conveying means 47. The base body 41 of the transport element 40 has a communication section 44 with a recognition device 45. The base body 41 also has a load section 49, which is designed for arranging load objects. The communication section 44 is arranged between the coupling section 44 and the load section 49.

FIG. 9 shows a transport element 140 which essentially corresponds to the transport element 40 according to FIG. 9. However, this transport element 140 differs from the previously described transport element 40 in that the ferromagnetic counterpart 143 has a multi-part structure and is incorporated in the base body 41. The transport elements 40, 140 typically consist of a plastic. The multi-part ferromagnetic counterpart 143 is incorporated in the base body 41 in such a way that the coupling section 142 itself has a ferromagnetic effect. In this case, the coupling section 142 consists of a 2-component plastic injection moulding in which the ferromagnetic counterparts 143—as shown—are incorporated in a distributed manner with the aid of an injection moulding process. The ferromagnetic counterparts 143 can also be distributed differently from the arrangement shown in the transport element 40, 140.

FIGS. 10 and 11 show a conveyor system 100 according to the invention. The conveyor system 100 described herein and its components arranged therein are described with reference to the magnetic coupling arrangement 10*a* according to FIG. 1. However, the magnetic coupling arrangement 10*a* in the conveyor system 100 is also interchangeable with one of the previously described magnetic coupling arrangements 10*b* to 10*e* according to FIGS. 2 to 8.

The conveyor system 100 for conveying suspended objects comprises a traction means 120, which is designed as a conveyor chain 121 and can be driven by a conveyor drive 150. The conveyor system 100 has a conveyor rail arrangement 122 with a first conveyor rail 123 and a second conveyor rail 124. The first conveyor rail 123 receives the conveyor chain 121. The carrier elements 11 with the magnet 15 are arranged on the conveyor chain 121 and are held on the conveyor chain 121 by means of the bolts 28.

The transport element 40 is mounted on the second conveyor rail 124 with the aid of the conveyor means 47, extends through the conveyor rail opening 125 and can move therein along the conveyor path. The transport element 40 has an anti-penetration device 48 that prevents the transport element 40 from fully penetrating a conveyor rail arrangement 122. The transport element 40 is arranged to be movable or pivotable on the conveyor means 47. A strong pendulum movement of the transport element 40 could cause the load section 49 of the transport element 40 to plunge completely into the conveyor rail opening 125 and become wedged there. This is prevented by the anti-tilt device 48, which is designed as a section on the load section 49 that is wider than the base body 41.

The conveyor chain 121 is moved along the conveyor section together with the carrier element 11, whereby the magnet 15 is magnetically coupled to the ferromagnetic counterpart 43 on the transport element 43 and moves the latter along the conveyor section. The conveyor chain 121 has a driver element 11 on each conveyor chain link. It is possible for a driver element 11 to convey a transport element 40 or for a driver element 11 to convey several transport elements 40. This is ensured by the separately adjustable conveying force for each driver element 11, whereby the air gap 25 can be adjusted separately in each case and thus the conveying force transmitted to the ferromagnetic counterpart 43 can vary.

On the conveyor chain 121, the respective driver elements 11 can be spaced between 10 mm and 1500 mm apart. This pitch spacing is also adjustable according to a particular embodiment of the invention and, if necessary, dependent on the spacing of the conveyor chain links.

An adjusting device 130 for adjusting a distance X between the traction means 120 and the at least one transport element 40 is provided on the conveyor system 100, whereby the air gap 25 in the magnetic coupling arrangement 10a-d described herein is adjustable.

An insert—for example a plastic insert—which changes the distance X can serve as an adjusting device 130. Alternatively or additionally, the adjusting device 130 comprises a stroke drive which changes the distance X between the conveyor chain 121 and the transport element 40. This allows the air gap 25 to be adjusted very finely.

The magnetic force, which can be set separately for each driver element 11, is set during magnetisation by means of a magnetisation device 200, which can be arranged temporarily or permanently on the conveyor system 100.

With the conveyor system 100 described herein, a method for assembly and maintenance can be realised, which comprises the following steps:

Providing a magnetisation device 200 on the conveyor system 100,

Magnetising at least one magnet 15 or at least one ferromagnetic counterpart 43 with a magnetic force by means of the magnetising device 200 before the conveyor system 100 is put into operation.

This allows the magnets 15 and/or the transport elements 40 in the magnetic coupling arrangement 10a to be individually magnetised.

For example, prior to commissioning, magnetisation of a further magnet 15 or a further ferromagnetic counterpart 43 with a magnetic force is carried out with the aid of the magnetisation device 200, whereby the respective magnets are magnetised to different degrees as required.

FIG. 12 shows a further conveyor system 300 for conveying suspended objects. This conveyor system 300 is constructed similarly to the conveyor system 100 according to FIG. 11 and FIG. 12 and has a conveyor rail arrangement 122 with a first conveyor rail 123 and a second conveyor rail 124. The conveyor system 300 can accommodate the transport elements 40, 140 as shown in FIG. 9 and FIG. 10.

In the following, the conveyor system with the transport element 140 according to FIG. 10 is described. The transport element 140 is mounted on the second conveyor rail 124 by means of the conveyor means 47 and can move along the conveyor section. The conveyor system 300 has a conveyor drive and at least one transport element 143. As traction means, the conveyor system 300 comprises an electromagnetic levitation system 311. The electromagnetic levitation system 311 is coupled to the ferromagnetic counterpart 143 and transmits the conveying force to the ferromagnetic counterpart 143 so that it can move along the conveying path.

In the above embodiments, the invention is illustrated using suspended conveying elements. However, it could also be constructed in reverse, in that the transport elements are arranged upright above the conveyor chain. In this respect, the claims are not to be interpreted in a restricted manner, but also include such upright set-ups with a magnetic coupling arrangement according to the invention in a conveyor system and/or for a conveyor system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A magnetic coupling arrangement in a conveyor system comprising at least one driver element for arrangement on a traction means of the conveyor system, the driver element comprising a receiving body having a receiving space for receiving
    a) at least one magnet in the receiving space, wherein the magnet can be brought into coupling connection at its coupling side with a coupling side of a ferromagnetic counterpart for conveying force transmission, or
    b) at least one ferromagnetic counterpart for a magnet in the receiving space, wherein the ferromagnetic counterpart can be brought into coupling connection at its coupling side with a coupling side of a magnet for conveying force transmission,
    and wherein
    a ferromagnetic plate is arranged on the magnet on at least one side facing away from the coupling side in order to shorten the path of the magnetic lines of force on this side of the magnet, wherein the ferromagnetic counterpart or the magnet is arranged on a transport element on which objects are arrangeable for moving along the conveyor.

2. The magnetic coupling arrangement according to claim 1, wherein the at least one ferromagnetic counterpart is also a magnet and preferably provides each at least one magnet on at least one of its sides facing away from the coupling side, a ferromagnetic plate being associated with each at least one magnet, the magnets being arranged in such a way that north poles and south poles are opposite one another, the ferromagnetic plate preferably being formed in an angular shape on at least one plate side.

3. The magnetic coupling arrangement according to claim 1, wherein an adjustable air gap extends between the coupling side of the at least one magnet and the coupling side of the at least one ferromagnetic counterpart, the spatial extension of which air gap in at least one direction is between 0.05 mm and 5 mm, preferably between 0.1 mm and 3 mm.

4. The magnetic coupling arrangement according to claim 1, wherein the ferromagnetic plate is arranged to be detachable and/or adjustable relative to the at least one magnet in order to influence the transmission of the conveying force, and in particular the ferromagnetic plate is connected to the at least one magnet in a materially bonded manner.

5. The magnetic coupling arrangement according to claim 1, wherein the or each magnet is assisted by at least one further magnet which is also connected—advantageously in a materially bonded manner—to the ferromagnetic plate on at least one side facing away from the coupling side.

6. The magnetic coupling arrangement according to claim 5, wherein the further magnet is arranged laterally adjacent to the or each magnet and preferably its magnetic poles are aligned complementary to the magnetic poles of the magnet.

7. The magnetic coupling arrangement according to claim 5, wherein an insulating layer is provided between the magnet and the at least one further magnet, the insulating layer preferably being formed by an air gap.

8. The magnetic coupling arrangement according to claim 1, wherein the magnets and the further magnets are of cuboidal design and are preferably composed of sintered material.

9. The magnetic coupling arrangement according to claim 1, wherein the receiving body has at least two receiving clamps which hold at least the ferromagnetic plate in a form-fitting manner, and in particular the receiving body is constructed from non-magnetic material—preferably from plastic.

10. The magnetic coupling arrangement according to claim 1, wherein the receiving body has at least one traction means connection for connecting the at least one driver element to a traction means, which is preferably designed as a bolt.

11. A magnetic coupling arrangement comprising at least one driver element for arrangement on a traction means of a conveyor system, wherein the driver element comprises a receiving body with a receiving space for receiving
   a) at least one magnet in the receiving space, wherein the magnet can be brought into coupling connection at its coupling side with a coupling side of a ferromagnetic counterpart for conveying force transmission, or
   b) at least one ferromagnetic counterpart for a magnet in the receiving space, wherein the ferromagnetic counterpart can be brought into coupling connection at its coupling side with a coupling side of a magnet for conveying force transmission,
   and wherein
   ferromagnetic plate is arranged on the magnet on at least one side facing away from the coupling side in order to shorten the path of the magnetic lines of force on this side of the magnet, wherein the ferromagnetic counterpart or the magnet is arranged on a transport element on which objects are arrangeable for moving along the conveyor.

12. The magnetic coupling arrangement according to claim 11, wherein the at least one ferromagnetic counterpart is also a magnet and preferably provides each at least one magnet on at least one of its sides facing away from the coupling side, a ferromagnetic plate being associated with each at least one magnet, the magnets being arranged in such a way that north poles and south poles are opposite one another, the ferromagnetic plate preferably being formed in an angular shape on at least one plate side.

13. The magnetic coupling arrangement according to claim 11, wherein an adjustable air gap extends between the coupling side of the at least one magnet and the coupling side of the at least one ferromagnetic counterpart, the spatial extension of which air gap in at least one direction is between 0.05 mm and 5 mm, preferably between 0.1 mm and 3 mm.

14. The magnetic coupling arrangement according to claim 11, wherein the ferromagnetic plate is arranged to be detachable and/or adjustable relative to the at least one magnet in order to influence the transmission of the conveying force, and in particular the ferromagnetic plate is connected to the at least one magnet in a materially bonded manner.

15. The magnetic coupling arrangement according to claim 11, wherein the or each magnet is assisted by at least one further magnet which is also connected—advantageously in a materially bonded manner—to the ferromagnetic plate on at least one side facing away from the coupling side.

16. The magnetic coupling arrangement according to claim 15, wherein the further magnet is arranged laterally adjacent to the or each magnet and preferably its magnetic poles are aligned complementary to the magnetic poles of the magnet.

17. The magnetic coupling arrangement according to claim 15, wherein an insulating layer is provided between the magnet and the at least one further magnet, the insulating layer preferably being formed by an air gap.

18. The magnetic coupling arrangement according to claim 11, wherein the magnets and the further magnets are of cuboidal design and are preferably constructed from sintered material.

19. The magnetic coupling arrangement according to claim 11, wherein the receiving body has at least two receiving clamps which hold at least the ferromagnetic plate in a form-locking manner, and in particular the receiving body is constructed of non-magnetic material—preferably plastic.

20. The magnetic coupling arrangement according to claim 11, wherein the receiving body has at least one traction means connection for connecting the at least one driver element to a traction means, which is preferably designed as a bolt.

21. The magnetic coupling arrangement of claim 11 wherein, the transport element has a base body which comprises a coupling section and a conveying section, the coupling section being designed for coupling to the conveyor system and having at least one ferromagnetic counterpart and the conveying section having conveying means for guiding in the conveying system, the ferromagnetic counterpart being incorporated in the base body, preferably being incorporated in the coupling section with the aid of a forming process, or the ferromagnetic counterpart being arranged detachably on the coupling section.

22. A conveyor system for conveying suspended or stationary objects comprising a traction means, in particular a conveyor chain, and a conveyor drive for driving the traction means, wherein the conveyor system comprises at least one driver element and at least one transport element, between which a magnetic coupling arrangement according to claim 1 is present.

23. The conveyor system according to claim 22, wherein an adjusting device for adjusting a distance between the traction means and the at least one transport element is present and preferably the conveyor system comprises a further entrainment element, the further driver element being spaced apart from the first driver element along the traction means and the spacing being adjustable, preferably between 10 mm and 1500 mm, in particular between 15 mm and 250 mm, along the traction means.

24. A method for setting up and maintaining a conveyor, in particular according to claim 22, the method comprising:
providing a magnetisation device on the conveyor,
magnetizing at least one magnet or at least one ferromagnetic counterpart with a magnetic force by means of the magnetizing device before putting the conveyor into operation.

25. The use of a magnetizing device for magnetizing at least one magnet or at least one ferromagnetic counterpart on an installed conveyor system with magnetic coupling arrangements, in particular according to claim 1.

26. A conveyor system for conveying suspended or stationary objects comprising a traction means, in particular a conveyor chain, and a conveyor drive for driving the traction means, wherein the conveyor system comprises at least one driver element and at least one transport element, between which a magnetic coupling arrangement according to claim 11 is present.

27. The use of a magnetizing device for magnetizing at least one magnet or at least one ferromagnetic counterpart on an installed conveyor system with magnetic coupling arrangements, in particular according to claim 11.

* * * * *